(12) United States Patent
Lee et al.

(10) Patent No.: US 9,111,142 B2
(45) Date of Patent: Aug. 18, 2015

(54) METHOD AND APPARATUS FOR PROVIDING SIGN INFORMATION

(71) Applicant: Electronics and Telecommunications Research Institute, Daejeon (KR)

(72) Inventors: Dong Jin Lee, Jecheon (KR); Ho Sub Yoon, Daejeon (KR); Jae Hong Kim, Daejeon (KR); Myung Ae Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 13/899,512

(22) Filed: May 21, 2013

(65) Prior Publication Data

US 2014/0086491 A1     Mar. 27, 2014

(30) Foreign Application Priority Data

Sep. 27, 2012   (KR) .................. 10-2012-0107563

(51) Int. Cl.
| | |
|---|---|
| G06K 9/00 | (2006.01) |
| G06K 9/32 | (2006.01) |
| G06K 9/44 | (2006.01) |
| G06K 9/48 | (2006.01) |
| G10L 13/00 | (2006.01) |

(52) U.S. Cl.
CPC .......... *G06K 9/00523* (2013.01); *G06K 9/3258* (2013.01); *G06K 9/44* (2013.01); *G06K 9/481* (2013.01); *G06K 2209/01* (2013.01); *G10L 13/00* (2013.01)

(58) Field of Classification Search
CPC ... G06K 9/00523; G06K 9/3528; G06K 9/44; G06K 9/481; G06K 2209/01; G10L 13/00
USPC .................................................. 382/190, 103
See application file for complete search history.

(56) References Cited

U.S. PATENT DOCUMENTS

| | | | | |
|---|---|---|---|---|
| 7,068,844 | B1 * | 6/2006 | Javidi et al. ................... | 382/218 |
| 7,171,046 | B2 * | 1/2007 | Myers et al. .................. | 382/187 |
| 7,466,841 | B2 * | 12/2008 | Bahlmann et al. ............ | 382/103 |
| 7,482,948 | B1 * | 1/2009 | Northway et al. ............ | 340/925 |

(Continued)

FOREIGN PATENT DOCUMENTS

| | | |
|---|---|---|
| KR | 10-2009-0036183 A | 4/2009 |
| KR | 10-2011-0094709 A | 8/2011 |

OTHER PUBLICATIONS

Nobuyuki Otsu, "A Threshold Selection Method from Gray-Level Histograms", IEEE Transactions on Systems, Man, and Cybernetics, Jan. 1979, pp. 62-66, vol. SMC-9, No. 1, IEEE.

(Continued)

*Primary Examiner* — Gregory M Desire

(57) ABSTRACT

A method and apparatus for proving sign information are disclosed. The sign information providing method includes: extracting a first sign from an input image, wherein the first sign is pre-defined; extracting a second sign representing information corresponding to the first sign around the location of the first sign, from the input image; and providing at least one piece of information of information about the first sign and information about the second sign in the form of voice. Accordingly, a user may correctly recognize information expressed by a sign.

13 Claims, 7 Drawing Sheets

(56) References Cited

U.S. PATENT DOCUMENTS

| | | | |
|---|---|---|---|
| 8,229,748 | B2 | 7/2012 | Chang et al. |
| 8,447,139 | B2* | 5/2013 | Guan et al. .................. 382/291 |
| 8,509,478 | B2* | 8/2013 | Haas et al. ................... 382/100 |
| 8,797,386 | B2* | 8/2014 | Chou et al. ...................... 348/46 |
| 2002/0080998 | A1* | 6/2002 | Matsukawa et al. .......... 382/103 |
| 2010/0074469 | A1* | 3/2010 | Nakamori et al. ............ 382/103 |
| 2011/0200250 | A1 | 8/2011 | Oh et al. |
| 2013/0058534 | A1* | 3/2013 | Zobel ............................ 382/103 |
| 2013/0117025 | A1* | 5/2013 | Park et al. ..................... 704/260 |
| 2014/0086491 | A1* | 3/2014 | Lee et al. ...................... 382/190 |

OTHER PUBLICATIONS

Lawrence R. Rabiner, "A Tutorial on Hidden Markov Models and Selected Applications in Speech Recognition", Proceedings of the IEEE, Feb. 1989, pp. 257-286, vol. 77, No. 2, IEEE.

Bernhard Froba et al., "Face Detection with the Modified Census Transform", Proceedings of the Sixth IEEE International Conference on Automatic Face and Gesture Recognition, 2004, pp. 1-6, IEEE Computer Society.

Cheng-Lin Liu et al., "Handwritten Chinese Character Recognition: Alternatives to Nonlinear Normalization", Proceedings of the Seventh International Conference on Document Analysis and Recognition, 2003, pp. 1-5, IEEE Computer Society.

Chih-Chung Chang et al., "LIBSVM: A Library for Support Vector Machines", 2001, pp. 1-39.

Ting-Fan Wu et al., "Probability Estimates for Multi-class Classification by Pairwise Coupling", Journal of Machine Learning Research 5, 2004, pp. 975-1005.

Dong-Jin Lee et al., "Sign Recognition with HMM/SVM hybrid for the visually-handicapped in subway stations", Proceedings of the $4^{th}$ International Joint Conference on Computational Intelligence, Oct. 2012, Barcelona, Spain.

Youngwoo Yoon et al., "Blob Extraction based Character Segmentation Method for Automatic License Plate Recognition System", 2011, pp. 2192-2196, IEEE.

Jieun Kim et al., "Graph Matching Method for Character Recognition in Natural Scene Images", $15^{th}$ International Conference on Intelligent Engineering Systems, Jun. 2011, pp. 347-350, IEEE, Poprad, Slovakia.

B. Ly Van et al., "Fusion of HMM's Likelihood and Viterbi Path for On-line Signature Verification", BioAW 2004, LNCS 3087, 2004, pp. 318-331, Springer-Verlag Berlin Heidelberg.

Maher Ahmed et al., "A Rotation Invariant Rule-Based Thinning Algorithm for Character Recognition", IEEE Transactions on Pattern Analysis and Machine Intelligence, Dec. 2002, pp. 1672-1678, vol. 24, No. 12, IEEE.

* cited by examiner (A)

METHOD AND APPARATUS FOR PROVIDING SIGN INFORMATION

CLAIM FOR PRIORITY

This application claims priority to Korean Patent Application No. 10-2012-0107563 filed on Sep. 27, 2012 in the Korean Intellectual Property Office (KIPO), the entire contents of which are hereby incorporated by reference.

BACKGROUND

1. Technical Field

Example embodiments of the present invention relate in general to a method and apparatus for providing sign information, and more specifically, to a method and apparatus for providing information about a sign indicating an exit in the form of voice.

2. Related Art

A conventional guidance system for blind people is based on a global positioning system (GPS), and provides a blind person with information about his/her current location in the form of voice. However, sometimes, the GPS-based guidance system fails to provide blind people with accurate location information due to the GPS' error.

Furthermore, if a GPS is located below the ground, location information provided by the GPS may have a greater error, and in this case, the GPS-based guidance system will fail to provide blind people walking along an underpass with accurate location information.

SUMMARY

Accordingly, example embodiments of the present invention are provided to substantially obviate one or more problems due to limitations and disadvantages of the related art.

Example embodiments of the present invention provide a method of providing information about a sign extracted according to an image processing method in the form of voice.

Example embodiments of the present invention also provide an apparatus of providing information about a sign extracted according to an image processing method in the form of voice.

In some example embodiments, a sign information providing method includes: extracting a first sign from an input image, wherein the first sign is pre-defined; extracting a second sign representing information corresponding to the first sign around the location of the first sign, from the input image; and providing at least one piece of information of information about the first sign and information about the second sign in the form of voice.

The extracting of the first sign may include: extracting a first area at which the first sign is located; removing a noise signal included in the first area; extracting feature information from the first area from which the noise signal has been removed, and recognizing a plurality of first sign candidates based on the feature information; and extracting the first sign satisfying an authentication algorithm from among the plurality of first sign candidates.

The extracting of the first sign satisfying the authentication algorithm may include extracting the first sign satisfying at least one of a Support Vector Machine (SVM)-based authentication algorithm and a Hidden Markov Model (HMM)-based authentication algorithm.

The extracting of the second sign from the input image may include: extracting a plurality of second area candidates at which the second sign is located, around the first area at which the first sign is located; extracting a second area from among the plurality of second area candidates based on at least one piece of information of brightness information and chroma information of the plurality of second area candidates; and extracting the second sign located in the second area.

The extracting of the second sign located in the second area may include: removing a noise signal included in the second area; extracting feature information from the second area from which the noise signal has been removed, and recognizing a plurality of second sign candidates based on the feature information; and extracting the second sign satisfying an authentication algorithm from among the plurality of second sign candidates.

The extracting of the second sign satisfying the authentication algorithm may include extracting the second sign satisfying at least one of a Support Vector Machine (SVM)-based authentication algorithm and a Hidden Markov Model (HMM)-based authentication algorithm.

The extracting of the first sign may include extracting an arrow indicating the direction of an exit, as the first sign.

The extracting of the second sign from the input image may include extracting a figure representing the number of an exit, as the second sign.

In other example embodiments, a sign information providing apparatus includes: an extractor configured to extract a first sign from an input image, wherein the first sign is pre-defined, and to extract a second sign representing information corresponding to the first sign around the location of the first sign, from the input image; and a provider configured to provide at least one piece of information of information about the first sign and information about the second sign in the form of voice The extractor may extract a first area at which the first sign is located, remove a noise signal included in the first area, extract feature information from the first area from which the noise signal has been removed, recognize a plurality of first sign candidates based on the feature information, and extract the first sign satisfying an authentication algorithm from among the plurality of first sign candidates.

The extractor may extract a plurality of second area candidates at which the second sign is located, around the first area at which the first sign is located, extract a second area from among the plurality of second area candidates based on at least one piece of information of brightness information and chroma information of the plurality of second area candidates, and extract the second sign located in the second area.

When the extractor extracts the second sign, the extractor may remove a noise signal included in the second area, extract feature information from the second area from which the noise signal has been removed, recognize a plurality of second sign candidates based on the feature information, and extract the second sign satisfying an authentication algorithm from among the plurality of second sign candidates.

The extractor may extract an arrow indicating the direction of an exit, as the first sign, and extract a figure representing the number of the exit, as the second sign.

According to the embodiments of the present invention, since extracting a small sign that could not be extracted due to distortion is possible, a figure (for example, information about the number of an exit) having a smaller size than an arrow (for example, information about the direction of the exit) may be extracted so that information about the figure as well as information about the arrow can be provided to blind people.

Also, by first extracting a first sign (for example, an arrow representing the direction of an exit) having a relatively great size and extracting a second sign (for example, a figure representing the number of the exit) having a smaller size than the first sign and located around the first sign, information expressed by the first and second signs may be recognized at a distance, thereby making it possible to quickly provide information about an exit to blind people.

BRIEF DESCRIPTION OF DRAWINGS

Example embodiments of the present invention will become more apparent by describing in detail example embodiments of the present invention with reference to the accompanying drawings, in which:

FIGS. 6A, 6B, and 6C are conceptual views illustrating a process of extracting feature vectors from an area;

DESCRIPTION OF EXAMPLE EMBODIMENTS

Figure 1:
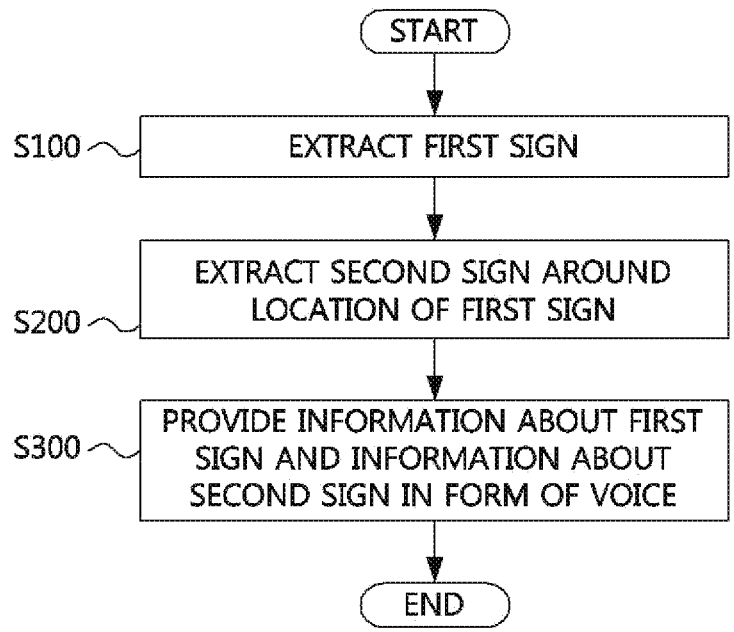
FIG. 1 is a flowchart illustrating a sign information providing method according to an embodiment of the present invention.

Example embodiments of the present invention are disclosed herein. However, specific structural and functional details disclosed herein are merely representative for purposes of describing example embodiments of the present invention; however, example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

Figure 2:
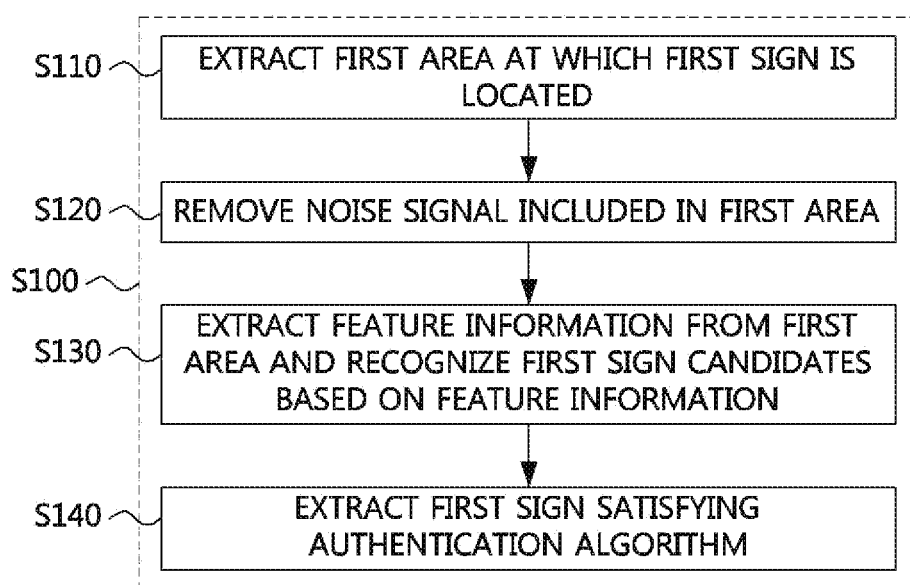
FIG. 2 is a flowchart specifying a process of extracting a first sign in the sign information providing method.
Figure 3:
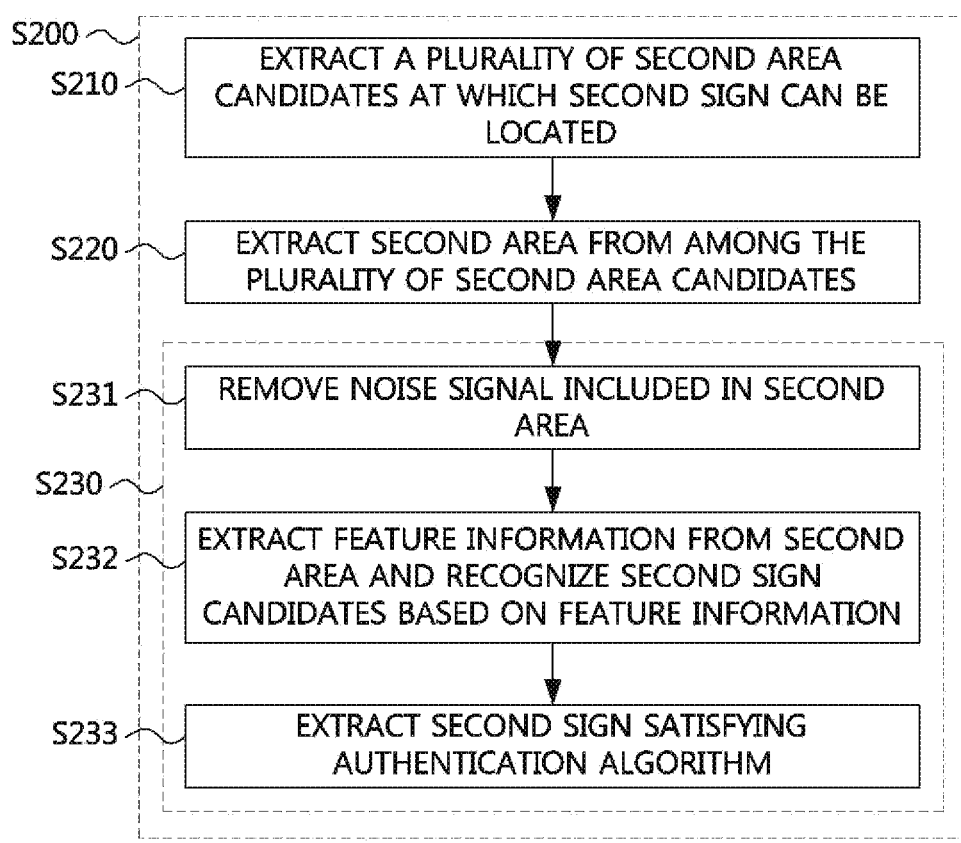
FIG. 3 is a flowchart specifying a process of extracting a second sign in the sign information providing method.
Figure 4:
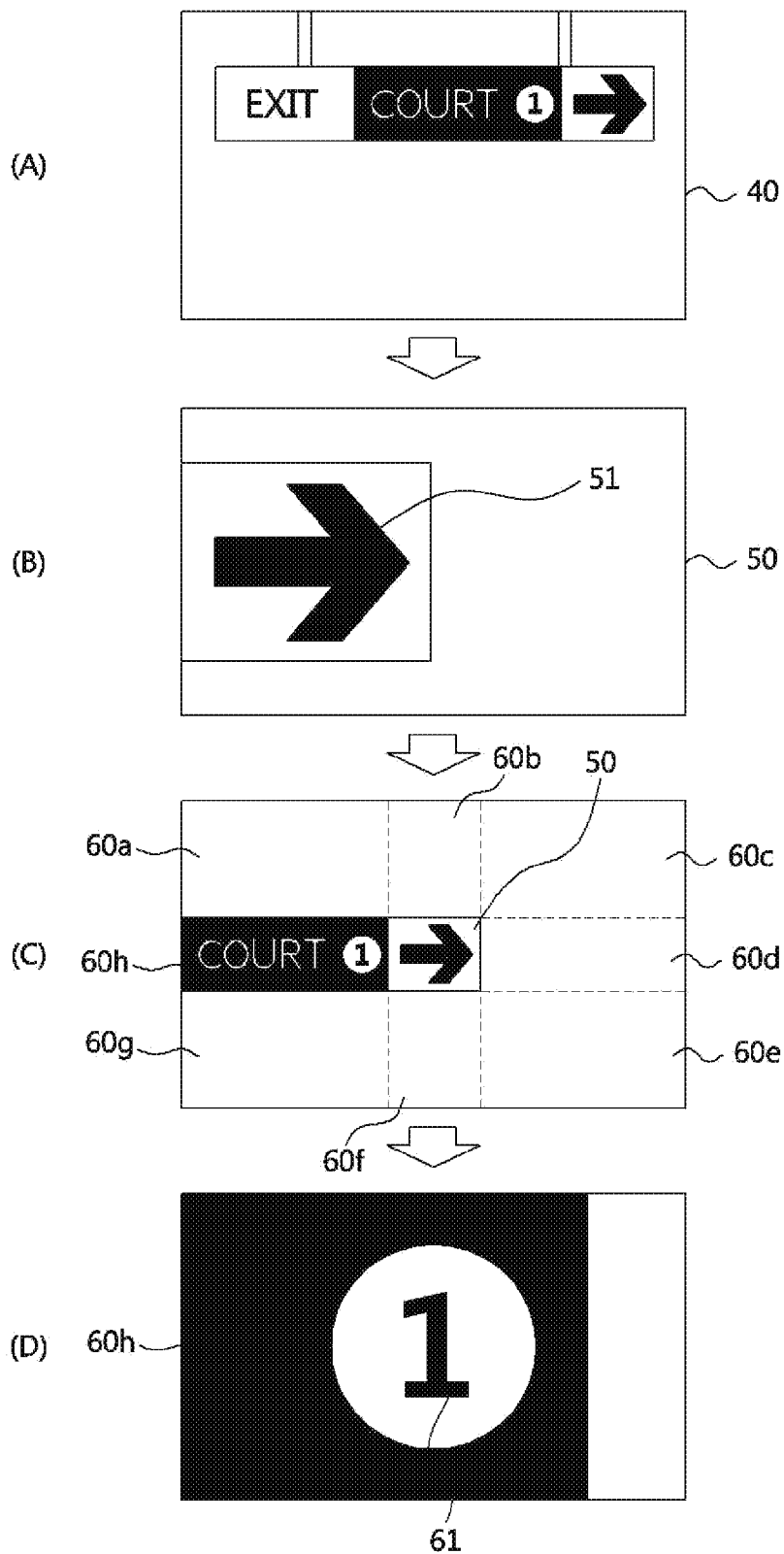
FIG. 4 is a conceptual view illustrating a process of extracting the first and second signs.

FIG. 1 is a flowchart illustrating a sign information providing method according to an embodiment of the present invention, FIG. 2 is a flowchart specifying a process of extracting a first sign in the sign information providing method, FIG. 3 is a flowchart specifying a process of extracting a second sign in the sign information providing method, and FIG. 4 is a conceptual view illustrating a process of extracting the first and second signs.

Referring to FIGS. 1 through 4, a sign information providing apparatus may extract a first sign from an input image, wherein the first sign is pre-defined (S100). The input image may be an image acquired through a camera mounted on the sign information providing apparatus, or an image stored in advance in the sign information providing apparatus. Also, the input image may be an image showing the inside of an underpass, as denoted by a reference number 40 in FIG. 4(a). The first sign may be an arrow indicating the direction of an exit, and for example, the first sign may be an arrow 51 illustrated in FIG. 4(b).

In detail, in operation S100, the sign information providing apparatus may extract a first area at which the first sign is located (S110). At this time, the sign information providing apparatus may use a Modified Census Transform (MCT)-Adaboost algorithm to extract the first area at which the first sign is located. That is, the sign information providing apparatus may use an MCT algorithm to extract a feature of the first sign, use an Adaboost algorithm to learn the feature of the first sign and create learning data of the first sign, and use the learning data to extract the first area at which the first sign is located. In the example of FIG. 4, if the first sign is the arrow 51, the sign information providing apparatus may extract a first area 50 including the first sign 51.

The MCT-Adaboost algorithm used in order to extract the first area at which the first sign is located is well-known in the art, and the sign information providing apparatus may use an MCT-Adaboost algorithm disclosed in Froba, B., Ernst, A., 2004. "Face Detection with the Modified Census Transform," IEEE Conf. on Automatic Face and Gesture Recognition, pp. 91-96.

After extracting the first area at which the first sign is located, the sign information providing apparatus may remove a noise signal included in the first area (S120). That is, the sign information providing apparatus may perform binarization, segmentation, and normalization, sequentially, to remove a noise signal included in the first area.

Figure 5:
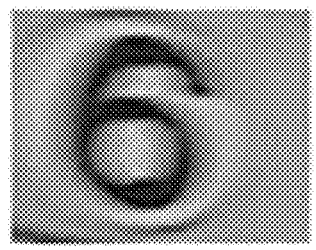
FIG. 5 is a conceptual view illustrating a process of binarizing areas.
Figure 5:
Figure 5:
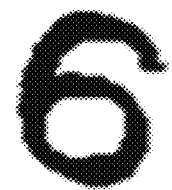
Figure 5:
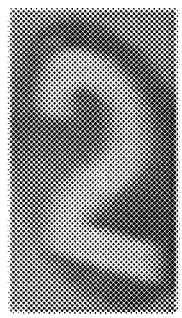
Figure 5:
Figure 5:

FIG. 5 is a conceptual view illustrating a process of binarizing areas.

Referring to FIG. 5, the sign information providing apparatus may use a "binarization method according to Otsu" or a "binarization method according to Niblack" as a binarization method. The "binarization method according to Otsu" is well-known in the art, and the sign information providing apparatus may use a "binarization method according to Otsu" disclosed in Otsu, N., 1979. "A threshold selection method from gray-level histogram," IEEE Trans. Syst. Man Cybern., vol. 9, pp. 62-66. The "binarization method according to Niblack" is also well-known in the art, and the sign information providing apparatus may use a "binarization method according to Niblack" disclosed in Niblack, W., 1986. "An Introduction to Image Processing," Prentice-Hall, Englewood Cliffs, pp. 115-116.

FIG. 5($a$) shows an exemplary image of a first area at which a first sign is located, FIG. 5($b$) shows the result of binarization of the image shown in FIG. 5($a$) based on the "binarization method according to Niblack", and FIG. 5($c$) shows the result of binarization of the image shown in FIG. 5($a$) based on the "binarization method according to Otsu". It can be seen from the results of comparison between the image shown in FIG. 5($b$) and the image shown in FIG. 5($c$) that the "binarization method according to Otsu" brings about better results than the "binarization method according to Niblack", and accordingly, in the sign information providing method according to the current embodiment, the sign information proving apparatus may perform binarization on the first area based on the "binarization method according to Otsu".

Also, when binarization is performed based on the "binarization method according to Otsu", the sign information providing apparatus may apply a threshold value set differently according to at least one of the brightness and chroma of the first sign (or, a first sign candidate). For example, if the brightness range of pixels is "0-255" and the brightness of a first sign (or, a first sign candidate) included in a first area is "255" (that is, a white color), the sign information providing apparatus may perform binarization after applying a threshold value resulting from adding "20" to a base threshold value. That is, if a first sign (or, a first sign candidate) is a white color and its base threshold value is "120", the sign information providing apparatus may perform binarization after applying a threshold value "140".

Meanwhile, if the brightness of a first sign (or, a first sign candidate) included in a first area is "0" (that is, a black color), the sign information providing apparatus may perform binarization after applying a threshold value resulting from subtracting "7" from a base threshold value. That is, if a first sign (or, a first sign candidate) is a black color and its base threshold value is "120", the sign information providing apparatus may perform binarization after applying a threshold value "113".

In FIG. 5, FIG. 5($d$) shows an exemplary image of a first area at which a first sign is located, FIG. 5($e$) shows the result of binarization of the image shown in FIG. 5($d$) based on the "binarization method according to Otsu", and FIG. 5($f$) shows the result of binarization of the image shown in FIG. 5($d$) based on the "binarization method according to Otsu in which different threshold values are set according to at least one of the brightness and chroma of a first sign (or a first sign candidate)". It can be seen from the results of comparison between the image shown in FIG. 5($e$) and the image shown in FIG. 5($f$) that the "binarization method according to Otsu in which different threshold values are set according to at least one of the brightness and chroma of a first sign (or, a first sign candidate)" brings about better results than the "binarization method according to Otsu".

After performing binarization, the sign information providing apparatus may perform segmentation (that is, noise signal extraction). At this time, the sign information providing apparatus may extract a noise signal by a blob analysis method. An example of the blob analysis method is disclosed in Yoon, Y. W., Ban, K. D., Yoon, H. S., Kim, J. H., 2011. "Blob Extraction based Character Segmentation Method for Automatic License Plate Recognition System," Conf. on Systems, Man, and Cybernetics (SMC), pp. 2192-2196.

After performing segmentation, the sign information providing apparatus may perform normalization on the noise signal. That is, the sign information providing apparatus may apply a median filter to the noise signal extracted by the blob analysis method, thereby removing the noise signal.

After removing the noise signal, the sign information providing apparatus may extract feature information from the first area from which the noise signal has been removed, and recognize a plurality of first sign candidates based on the feature information (S130). At this time, the sign information providing apparatus may perform the process of "feature information extraction and first sign candidates recognition" using two methods. That is, the sign information providing apparatus may extract the first sign candidates from the first area using two methods: a first method of extracting feature information from the first area through an 8-direction gradient features method and recognizing the first sign candidates based on the feature information using a Library for Support Vector Machine (LIBSVM) and a Support Vector Machine (SVM); and a second method of extracting feature vectors (that is, feature information) from the first area through a feature vector creating method and recognizing the first sign candidates from the feature vectors using a Hidden Markov Model (HMM).

First Method (8-Direction Gradient Features Method, LIBSVM, and SVM)

The sign information providing apparatus may extract feature information from the first area using the 8-direction gradient features method. The 8-direction gradient features method is well-known in the art, and the sign information providing apparatus may use an 8-direction gradient features method disclosed in Liu, C. L., 2008. "Handwritten Chinese character recognition: effects of shape normalization and feature extraction," Lecture Notes in Computer Science, vol. 4768/2008, pp. 104-128.

That is, the sign information providing apparatus may calculate the weight of each pixel included in the first area using the 8-direction gradient features method. At this time, the sign information providing apparatus may accumulate weights in 8 directions ranging from 0° to 360°, and merge the individual pixels in the 8 directions into an N×N block in the first area based on the weights. Through the process, the sign information providing apparatus may extract the feature information from the first area.

After extracting the feature information from the first area, the sign information providing apparatus may recognize the first sign candidates from the feature information using the LIBSVM and SVM that are machine learning algorithms.

Here, the LIBSVM and SVM are well-known in the art, and the sign information providing apparatus may use an LIBSVM and SVM disclosed in Chang, C. C., Lin, C. J, 2001. "LIBSVM: a library for support vector machines," ACM Transactions on Intelligent System and Technology, 2:27:1-7:27.

Second Method (Feature Vector Creating Method and HMM)

The sign information providing apparatus may extract feature vectors (that is, feature information) from the first area based on the feature vector creating method. The feature vector creating method is well-known in the art, and the sign information providing apparatus may use a feature vector creating method disclosed in Kim, J. E., Yoon, H. S., 2011. "Graph Matching Method for Character Recognition in Natural Scene Images," Conf. on Intelligent Engineering Systems (INES), pp. 347-350.

The following Table 1 defines terms used in the feature vector creating method.

TABLE 1

| Term | Definition | Abbreviation (Pixel Value) | Feature Value |
|---|---|---|---|
| Foreground Pixel | The pixel represents a skeleton of the image and are denoted by 1s. | '0' (255) | |
| Background Pixel | The pixel represents a non-skeleton of the image and are denoted by 0s. | '—' (0) | |
| EndPoint | The point is connected with only one neighbor pixel in a 3 × 3 window. | 'E' (20) | 0 |
| Branch Point | The point is connected with more than three neighbor pixels in a 3 × 3 window. | 'B' (10) | 9A |
| CurvePoint | The point is connected with two neighbor pixel in a 3 × 3 window. Also, endpoints and branch points cannot exist in a 9 × 9 window. | 'C' (30) | XY |
| Chain-code | The chain-code represents a set of direction vectors. | 'Number 1 to 8' (1 to 8) | Number 1 to 8 |

In Table 1, the foreground pixel represents a skeleton of the first area and may be defined as "1s". If the pixel value is "255", the foreground pixel may be represented as "0". The background pixel represents a non-skeleton of the first area and may be defined as "0s". If the pixel value is "0", the background pixel may be represented as "−". The end point represents a point connected to only one neighbor pixel in a 3×3 window, and if the pixel value is "20", the end point may be represented as "E", and the feature value may be represented as "0".

The branch point represents a point connected to at least three neighbor pixels in a 3×3 window, and if the pixel value is "10", the branch point may be represented as "B", and the feature value may be represented as "9A". The curve point represents a point connected to two neighbor pixels in a 3×3 window when neither end points nor branch points can exist in a 9×9 window, and if the pixel value is "30", the curve point may be represented as "C", and the feature value may be represented as "XY". The chain-code represents a set of direction vectors, and if the pixel value is "1 to 8", the chain-code may be represented as "Number 1 to 8", and the feature value may also be represented as "Number 1 to 8".

As the first process of the feature vector creating method, the sign information providing apparatus may apply Ahmed's thinning algorithms to the first area from which the noise signal has been removed. The Ahmed's thinning algorithms are well-known in the art, and the sign information providing apparatus may use an algorithm disclosed in Ahmed, M., Ward, R., 2002. "A Rotation Invariant Rule-Based Thinning Algorithm for Character Recognition," IEEE Transactions on Pattern Analysis and Machine Intelligence, vol. 24, pp. 1672-1678.

Using the Ahmed's thinning algorithms, a binarized image can be maintained, and after the Ahmed's thinning algorithms are executed, a skeleton of the first area can be extracted.

As the second process of the feature vector creating method, the sign information providing apparatus may extract end points and branch points located in the first area using a 3×3 window, and then, extract a starting point according to priority. That is, the sign information providing apparatus may extract an end point located in the top-left area as a starting point, extract a branch point located in the top-left area as a starting point when no end point exists in the top-left area, and extract a foreground pixel located in the top-left area as a starting point when no branch point exists in the top-left area.

Then, the sign information providing apparatus may track foreground pixels located in the first area from the starting point to create tracking information, and store the tracking information in a vector space. The vector space may be simply referred to as "Vec". In this way, chain-codes may be created, and the completed chain-codes may be represented as illustrated in FIG. 6A. Thereafter, the sign information providing apparatus may apply the median filter to the pixel values of the chain-codes, and the median filter may be a filter disclosed in Kim, J. E., Yoon, H. S., 2011. "Graph Matching Method for Character Recognition in Natural Scene Images," Conf. on Intelligent Engineering Systems (INES), pp. 347-350.

Figures 6B, 6C:
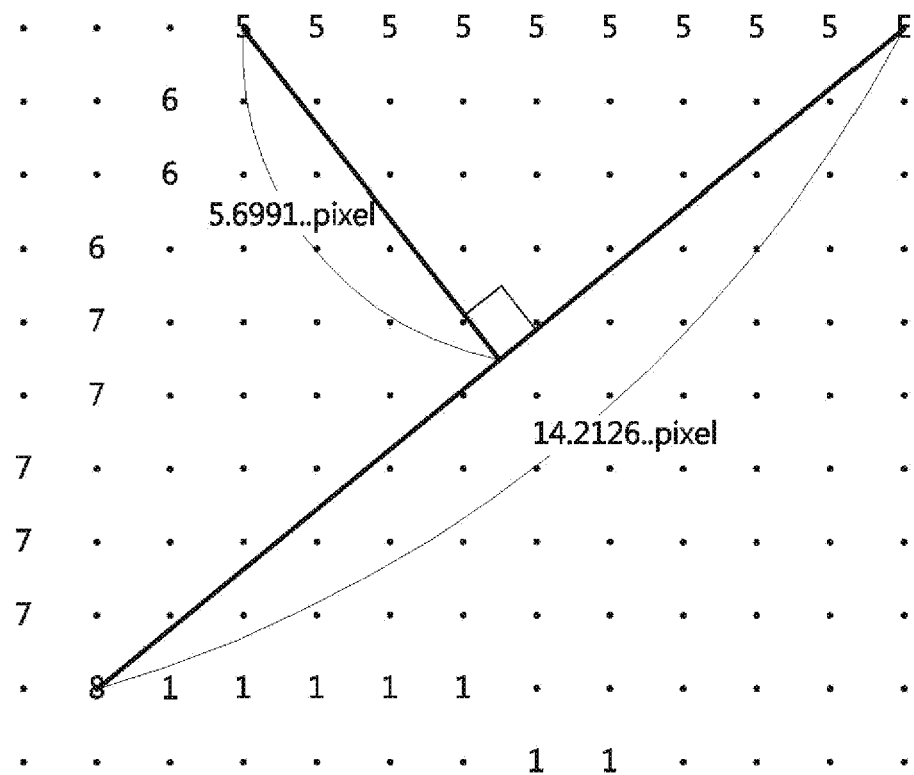

FIGS. 6A, 6B, and 6C are conceptual views illustrating a process of extracting feature vectors from an area, wherein FIG. 6A shows chain-codes, FIG. 6B is a view illustrating a process of extracting a curve point, and FIG. 6C shows feature vectors.

As the third process of the feature vector creating method, the sign information providing apparatus may extract curve points located in the first area, and remove curve points that do not satisfy specific conditions which will be described below with reference to FIG. 6B. An algorithm corresponding to the third process is shown in Table 2 as follows.

```
Begin
A = point (only for Curve Point)
B = point on line CD orthogonal with A
Line CD = A line from Point to Vec[i]
Point = the x and y coordinates of the starting point
Vec = vector space excluding candidate curve points
Vec2 = vector space including candidate curve points
nMinimum = 9 pixel
dThreshold = 4.95 pixel
nIndex = 0
```

```
For(i=3 to vec.size-1)
    Line CD = distance from Point to Vec2[i]
    If (Vec2[i] == Branch Point && Vec2[i] == End point)
        Point = Vec2[i+1]
        nIndex = i + 1
    If (line CD > nMinimum)
        For(j=nIndex to i)
            If (vec2[j] == Curve Point)
                A = Vec2[j]
                nIndex = Find the maximum distance from A to
                        B longer Than dThreshold
            If (success to find the curve point)
                Update (Vec)
                i = nIndex
    Point = the x,y coordinates of the Vec2[nIndex]
End
```

In Table 2, "A" represent a curve point, "Point" represents (x, y) which is the x and y coordinates of a starting point, "Vec" represents a vector space excluding curve point candidates, "Vec2" represents a vector space including the curve point candidates, "Line CD" represents a distance from "Point" to "Vec[i]", and "B" represents a point on "Line CD" orthogonal with "A".

In order to calculate a maximum distance from "A" to "B", the sign information providing apparatus may calculate an angle θ between "Line CD" and the x axis (see FIG. 6B), and rotate points located between "Point" and "Vec2[i]" by the angle θ in the clockwise direction. At this time, the sign information providing apparatus may use Equation 1 below.

$$(y')=(x-a)\times\sin\theta+(y-b)\times\cos\theta \quad (1)$$

In Equation 1, a point (x, y) represents the x and y coordinates of "A", a point (a, b) represents the x and y coordinates of "Point", "θ" represents an angle between "Line CD" and "x-axis", and the absolute value of y' represents the distance between "A" and "B".

As the fourth process of the feature vector creating method, the sign information providing apparatus may create feature vectors using a set of pixel values, and the created feature vectors are shown in FIG. 6C. The feature vectors may represent feature information extracted from the first area.

After creating the feature vectors (that is, feature information) about the first area through the feature vector creating method, the sign information providing apparatus may recognize first sign candidates from the feature vectors using the HMM. The HMM is well-known in the art, and the sign information providing apparatus may use an HMM disclosed in Rabiner, L. R., 1989. "A tutorial on hidden Markov models and selected applications in speech recognition," Proc. of the IEEE, vol. 77, pp. 257-286.

After recognizing the plurality of first sign candidates, the sign information providing apparatus may extract a first sign satisfying an authentication algorithm from among the plurality of first sign candidates (S140). The sign information providing apparatus may use at least one of an SVM-based authentication algorithm and an HMM-based authentication algorithm as the authentication algorithm to extract the first sign.

That is, the sign information providing apparatus may apply an SVM-based authentication algorithm to the first sign candidates recognized through the "first method" to verify a first sign candidate recognized through the "first method". At this time, the sign information providing apparatus may use, as the SVM-based authentication algorithm, an algorithm disclosed in Wu, T. F., Lin, C. J., Weng, R. C., 2004. "Probability Estimates for Multi-class Classification by Pairwise Coupling," The Journal of Machine Learning Research, vol. 5, pp. 975-1005.

Meanwhile, the sign information providing apparatus may apply an HMM-based authentication algorithm (for example, HMM's log-likelihood) to first sign candidates recognized through the "second method" to verify a first sign candidate recognized through the "second method". At this time, the sign information providing apparatus may use, as the HMM-based authentication algorithm, an algorithm disclosed in Van, B. L., Garcia-Salicetti, S., Dorizzi, B., 2004. "Fusion of HMM's likelihood and Viterbi path for on-line signature verification," Proc. of Lecture Notes in Computer Science, vol. 3072. Berlin, Germany: Springer-Verlag, pp. 16-22.

For example, the sign information providing apparatus may apply the SVM-based authentication algorithm to a first sign candidate recognized through the "first method", and if the result of the application is determined to be "true", the sign information providing apparatus may extract the first sign candidate recognized through the "first method" as a first sign. Meanwhile, if the result obtained by applying the SVM-based authentication algorithm to the first sign candidate recognized through the "first method" is determined to be "false", the sign information providing apparatus may extract a first sign candidate recognized through the "second method" as a first sign. At this time, the sign information providing apparatus may apply the HMM-based authentication algorithm to the first sign candidate recognized through the "second method", and extract a first sign according to the result of the application.

On the contrary, the sign information providing apparatus may apply the HMM-based authentication algorithm to the first signal candidate recognized through the "second method", and if the result of the application is determined to be "true", the sign information providing apparatus may extract the first sign candidate recognized through the "second method" as a first sign. Meanwhile, if the result obtained by applying the HMM-based authentication algorithm to the first sign candidate recognized through the "second method" is determined to be "false", the sign information providing apparatus may extract a first sign candidate recognized through the "first method" as a first sign. At this time, the sign information providing apparatus may apply the SVM-based authentication algorithm to the first sign candidate recognized through the "first method", and extract a first sign according to the result of the application.

Figure 7:
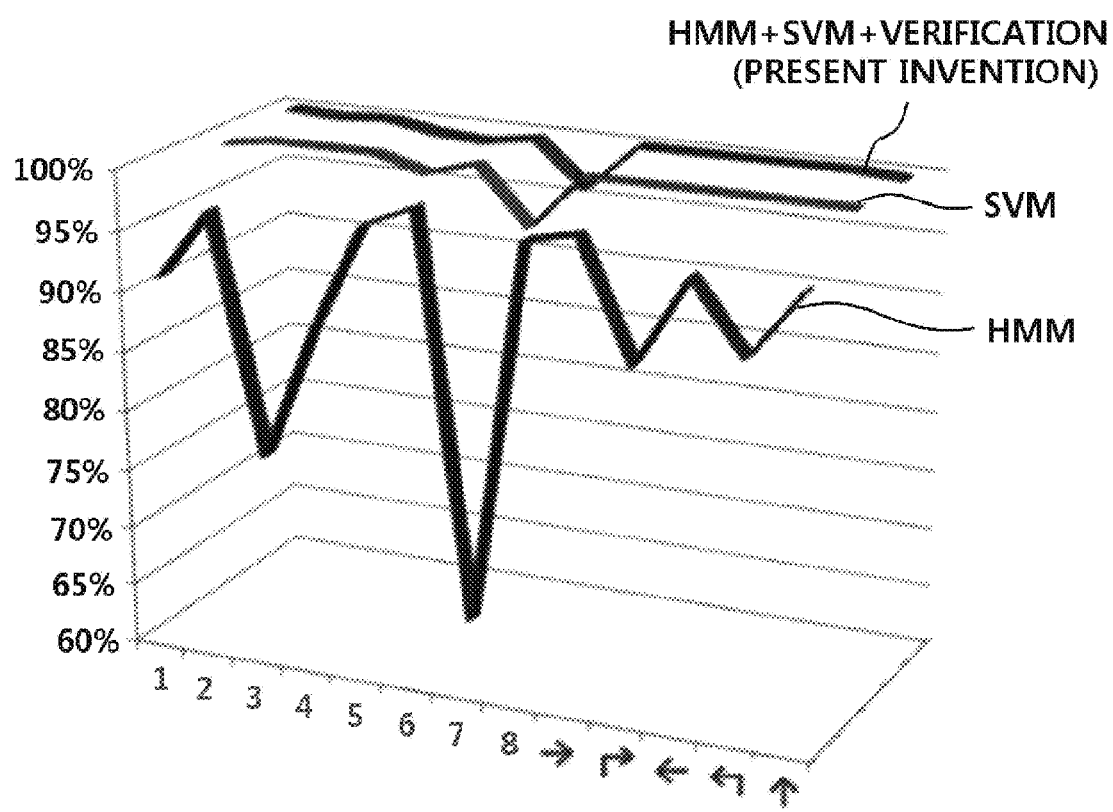
FIG. 7 is a graph comparing measurement results when the sign information providing method according to the embodiment of the present invention is applied and when conventional methods are applied.

FIG. 7 is a graph comparing measurement results when the sign information providing method according to the embodiment of the present invention is applied and when conventional methods are applied, and the following Table 3 is a table comparing the measurement results when the sign information providing method according to the embodiment of the present invention is applied and when the conventional methods are applied.

TABLE 3

|  | Exit number (accuracy rates: %) | Arrow (accuracy rates: %) | TPR (%) | FPR (%) |
| --- | --- | --- | --- | --- |
| Hmm*verification | 90.0 | 95.9 | 90.7 | 7.7 |
| Svm | 99.3 | 100 | 79.7 | 0.3 |
| Hmm*svm*verification | 99.5 | 99.8 | 86.1 | 0.3 |

Referring to FIG. 7 and Table 3, the first conventional method (HMM+verification) is a method of recognizing a sign based on an HMM and verifying the recognized sign through an HMM-based authentication algorithm, and the measurement results when the first conventional method is applied show that the accuracy rate of recognition of an exit number is 90.0%, the accuracy rate of recognition of an arrow is 95.9%, a true positive rate (TPR) is 90.7%, and a false positive rate (FPR) is 7.7%.

The second conventional method (Svm) is a method of recognizing a sign based on an SVM, and the measurement results when the second conventional method is applied show that the accuracy rate of recognition of an exit number is 99.3%, the accuracy rate of recognition of an arrow is 100%, a TPR is 79.7%, and an FPR is 0.3%.

The measurement results when the sign information providing method (HMM+svm+verification) according to the embodiment of the present invention is applied show that the accuracy rate of recognition of an exit number is 99.5%, the accuracy rate of recognition of an arrow is 99.8%, a TPR is 86.1%, and an FPR is 0.3%.

That is, it can be seen from the measurement results of Table 3 that the sign information providing method according to the embodiment of the present invention brings about better results than the conventional methods.

After extracting the first sign from the input image, the sign information providing apparatus may extract a second sign representing information corresponding to the first sign from the input image, based on the location of the first sign (S200). The second sign may be a figure representing an exit number, and a figure "1" 61 as illustrated in FIG. 4(d) may be the second sign. That is, if the first sign is an arrow representing the direction of an exit, the second sign may be an exit number corresponding to the direction indicated by the arrow. In detail, the sign information providing apparatus may extract a plurality of second area candidates at which the second sign can be located, around the first area at which the first sign is located (S210). Referring to FIG. 4(c), the sign information providing apparatus may extract a plurality of second area candidates 60a, 60b, 60c, 60d, 60e, 60f, 60g, and 60h around the first area 50 at which the first sign 51 is located.

The sign information providing apparatus may set the sizes of the plurality of second area candidates 60a, 60b, 60c, 60d, 60e, 60f, 60g, and 60h using Equations (2) and (3) below.

RecLeft=ArrowLeft−(ArrowWidth×3)

RecTop=ArrowTop−(ArrowHeight/2)

RecRight=ArrowLeft−1

RecBottom=ArrowBottom+(ArrowHeight/2)  (2)

Equation (2) is used to set the size of the second area candidate 60h located in the left of the first area 50 at which the first sign 51 is located. In Equation (2), "RecLeft" represents the coordinate of the left side of the second area candidate 60h, "RecTop" represents the coordinate of the top side of the second area candidate 60h, "RecRight" represents the coordinate of the right side of the second area candidate 60h, "RecBottom" represents the coordinate of the bottom side of the second area candidate 60h, "ArrowTop" represents the coordinate of the top side of the first area 50, "ArrowBottom" represents the coordinate of the bottom side of the first area 50, "ArrowLeft" represents the coordinate of the left side of the first area 50, "ArrowWidth" represents the width length of the first area 50, and "ArrowHeight" represents the height length of the first area 50 (for convenience of description, FIG. 4(c) schematically illustrates the first area 50 and the plurality of second area candidates 60a, 60b, 60c, 60d, 60e, 60f, 60g, and 60h, and the size of the second area candidate 60h illustrated in FIG. 4(c) may be different from the result of calculation by Equation (2)).

RecLeft=ArrowRight+1

RecTop=ArrowTop−(ArrowHeight/2)

RecRight=ArrowRight+(ArrowWidth×3)

RecBottom=ArrowBottom+(ArrowHeight/2)  (3)

Equation (3) is used to set the size of the second area candidate 60d located in the right of the first area 50 at which the first sign 51 is located. In Equation (3), "RecLeft" represents the coordinate of the left side of the second area candidate 60d, "RecTop" represents the coordinate of the top side of the second area candidate 60d, "RecRight" represents the coordinate of the right side of the second area candidate 60d, "RecBottom" represents the coordinate of the bottom side of the second area candidate 60d, "ArrowRight" represents the coordinate of the right side of the first area 50, "ArrowTop" represents the coordinate of the top side of the first area 50, "ArrowBottom" represents the coordinate of the bottom side of the first area 50, "ArrowWidth" represents the width length of the first area 50, and "ArrowHeight" represents the height length of the first area 50 (for convenience of description, FIG. 4(c) schematically illustrates the first area 50 and the plurality of second area candidates 60a, 60b, 60c, 60d, 60e, 60f, 60g, and 60h, and the size of the second area candidate 60d illustrated in FIG. 4(c) may be different from the result of calculation by Equation (3)).

Equations (2) and (3) are used only as a method for setting the size of a second area candidate, and the sign information providing apparatus may set the size of a second area candidate using another method instead of Equations (2) and (3).

After extracting the plurality of second area candidates, the sign information providing apparatus may extract a second area from among the plurality of second area candidates using at least one piece of information of brightness information and chroma information of the plurality of second area candidates (S220). For example, the sign information providing apparatus may extract the darkest area (that is, an area having brightness close to 0 when the range of brightness is from 0 to 255) among the plurality of second area candidates, as a second area. In the example of FIG. 4(c), since the second area candidate 60h among the plurality of second area candidates 60a, 60b, 60c, 60d, 60e, 60f, 60g, and 60h is darkest, the sign information providing apparatus may extract the second area candidate 60h as a second area.

Meanwhile, the sign information providing apparatus may extract a second area candidate having a greatest "R" value among RGB (Red Green Blue) color values as a second area, a second area candidate having a greatest "G" value among the RGB color values as a second area, or a second area candidate having a greatest "B" value among the RGB color values as a second area.

After extracting the second area, the sign information providing apparatus may extract a second sign included in the second area (S230). In detail, the sign information providing apparatus may remove noise signal included in the second area (S231), and at this time, the sign information providing apparatus may remove noise signal included in the second area according to the "method of removing noise signal included in the first area" as described above in operation S120.

That is, the sign information providing apparatus may perform binarization, segmentation, and normalization, sequentially, to remove noise signal included in the second area, wherein the binarization may be the "binarization method according to Otsu", the "binarization method according to Niblack," or the "binarization method according to Otsu in which different threshold values are set according to at least one of brightness and chroma", which are well-known in the art, the segmentation may be the "blob analysis method" which is well-known in the art, and the normalization may be the "medium filter" which is also well-known in the art.

After removing the noise signal included in the second area, the sign information providing apparatus may extract feature information from the second area from which noise signal has been removed, and recognize a plurality of second sign candidates based on the feature information (S232). At this time, the sign information providing apparatus may extract feature information from the second area according to the "method of extracting feature information from the first area and recognizing a plurality of first sign candidates based on the feature information" as described above in operation S130, and recognize a plurality of second sign candidates based on the feature information.

That is, the sign information providing apparatus may recognize a second sign candidate based on the "first method (8-direction gradient features method, LIBSVM, and SVM)" and another second sign based on the "second method (the feature vectors creating method and HMM)".

After recognizing the plurality of second sign candidates, the sign information providing apparatus may extract a second sign satisfying an authentication algorithm from among the plurality of second sign candidates (S233), and at this time, the sign information providing apparatus may extract a second sign satisfying an authentication algorithm according to the "method of extracting a first sign satisfying an authentication algorithm" as described above in operation S140.

That is, the sign information providing apparatus may extract a second sign satisfying an authentication algorithm using at least one of the "SVM-based authentication algorithm" and the "HMM-based authentication algorithm".

For example, the sign information providing apparatus may apply the SVM-based authentication algorithm to a second sign candidate recognized through the "first method", and if the result of the application is determined to be "true", the sign information providing apparatus may extract the second sign candidate recognized through the "first method" as a second sign. Meanwhile, if the result obtained by applying the SVM-based authentication algorithm to the second sign candidate recognized through the "first method" is determined to be "false", the sign information providing apparatus may extract a second sign candidate recognized through the "second method" as a second sign. At this time, the sign information providing apparatus may apply the HMM-based authentication algorithm to the second sign candidate recognized through the "second method", and extract a second sign according to the result of the application.

On the contrary, the sign information providing apparatus may apply the HMM-based authentication algorithm to the second sign candidate recognized through the "second method", and if the result of the application is determined to be "true", the sign information providing apparatus may extract the second sign candidate recognized through the "second method" as a second sign. Meanwhile, if the result obtained by applying the HMM-based authentication algorithm to the second sign candidate recognized through the "second method" is determined to be "false", the sign information providing apparatus may extract a second sign candidate recognized through the "first method" as a second sign.

At this time, the sign information providing apparatus may apply the SVM-based authentication algorithm to the second sign candidate recognized through the "first method", and extract a second sign according to the result of the application. The extracted second sign may be a figure "1" 61 as illustrated in FIG. 4(d).

After extracting the second sign satisfying the authentication algorithm, the signal information providing apparatus may provide at least one piece of information of information about the first sign and information about the second sign in the form of voice. For example, if information about the first sign is "→" and information about the second sign is "3", the sign information providing apparatus may provide a user with a voice message saying "exit number 3 in the right direction", and if information about the first sign is "←" and information about the second sign is "4", the sign information providing apparatus may provide the user with a voice message saying "exit number 4 in the left direction".

Figure 8:
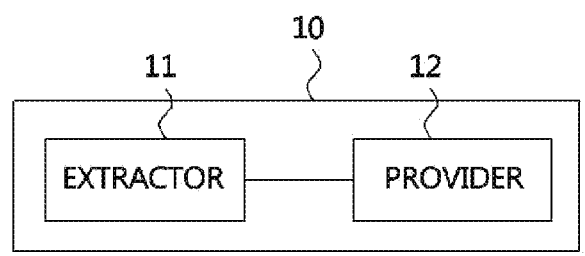
FIG. 8 is a block diagram illustrating a sign information providing apparatus according to an embodiment of the present invention.

FIG. 8 is a block diagram illustrating a sign information providing apparatus according to an embodiment of the present invention.

Referring to FIG. 8, the sign information providing apparatus 10 may include an extractor 11 and a provider 12. Also, the sign information providing apparatus 10 may further include a camera (not shown) for acquiring images and a storage unit (not shown) for storing results created by the extractor 11, the provider 12, and the camera.

The extractor 11 may extract a pre-defined first sign from an input image, and extract a second sign representing information corresponding to the first sign around the location of the first sign, from the input image.

When extracting the pre-defined first sign, the extractor 11 may extract a first area at which the first sign is located according to the method described above in operation S110, remove a noise signal included in the first area according to the method described above in operation S120, extract feature information from the first area according to the method described above in operation S130, extract a plurality of first sign candidates based on the feature information, and extract a first sign satisfying an authentication algorithm from among the plurality of first sign candidates according to the method described above in operation S140.

When extracting the second sign from the input image, the extractor 11 may extract a plurality of second area candidates at which the second sign can be located, around the first area at which the first sign is located, according to the method described above in operation S210, extract a second area from among the plurality of second area candidates, based on at least one piece of information of brightness information and chroma information of the plurality of second area candidates according to the method described above in operation S220, and detect a second sign included in the second area according to the second method described above in operation S230.

In detail, when detecting the second sign included in the second area, the extractor 11 may remove a noise signal included in the second area according to the method described above in operation S231, extract feature information from the second area and recognize a plurality of second sign candidates based on the feature information according to the method described above in operation S232, and extract a second sign satisfying an authentication algorithm from among the plurality of second sign candidates according to the method described above in operation S233.

The provider 12 may provide at least one piece of information of information about the first sign and information about the second sign in the form of voice. For example, if information about the first sign is "→" and information about the second sign is "3", the provider 12 may provide a user with a voice message saying "exit number 3 in the right direction", and if information about the first sign is "←" and information about the second sign is "4", the provider 12 may provide the user with a voice message saying "exit number 4 in the left direction".

The functions that are performed by the extractor 11 and the provider 12 may be substantially performed by a processor (for example, a central processing unit (CPU) and/or a graphics processing unit (GPU), etc.), and the individual operations illustrated in FIGS. 1, 2, and 3 may be performed by the processor.

Also, the extractor 11 and the provider 12 may be implemented as a single unit, for example, a single physical apparatus or a single module. Also, each of the extractor 11 and the provider 12 may be implemented as a single physical apparatus, a plurality of physical apparatuses not forming a group, or a group.

The methods according to the embodiments of the present invention may be implemented in the form of program commands executable by various kinds of computers and recorded on a computer-readable recording medium. The computer-readable recording medium may include program commands, data files, data structures, or the like, solely or in combination. The program commands recorded on the medium may be specially designed and configured for the present invention or be known to and used by those skilled in the computer software fields. The recording medium includes hardware units such as ROM, RAM, and flash memories, which are specially configured to store and perform program commands. The program command includes, for example, machine language codes composed by a compiler and high-level language codes executable by a computer using an interpreter, or the like. The hardware unit may be configured to operate as at least one software module in order to perform operations of the present disclosure, or vice versa.

While the example embodiments of the present invention and their advantages have been described in detail, it should be understood that various changes, substitutions, and alterations may be made herein without departing from the scope of the invention.

What is claimed is:

1. A sign information providing method comprising:
    extracting a first sign from a first area within an input image of an object, wherein the first sign is pre-defined;
    extracting a second sign from a second area of the input image, the second sign representing information corresponding to the first sign around a location of the first sign on the object; and
    providing at least one piece of information about the first sign and information about the second sign in the form of a voice message.

2. The sign information providing method of claim 1, wherein the extracting of the first sign comprises:
    extracting a first area at which the first sign is located;
    removing a noise signal included in the first area;
    extracting feature information from the first area from which the noise signal has been removed, and recognizing a plurality of first sign candidates based on the feature information; and
    extracting the first sign satisfying an authentication algorithm from among the plurality of first sign candidates.

3. The sign information providing method of claim 2, wherein the extracting of the first sign satisfying the authentication algorithm comprises extracting the first sign satisfying at least one of a Support Vector Machine (SVM)-based authentication algorithm and a Hidden Markov Model (HMM)-based authentication algorithm.

4. The sign information providing method of claim 1, wherein the extracting of the second sign from the input image comprises:
    extracting a plurality of second area candidates at which the second sign is located, around the first area at which the first sign is located;
    extracting a second area from among the plurality of second area candidates based on at least one piece of information of brightness information and chroma information of the plurality of second area candidates; and
    extracting the second sign located in the second area.

5. The sign information providing method of claim 4, wherein the extracting of the second sign located in the second area comprises:
    removing a noise signal included in the second area;
    extracting feature information from the second area from which the noise signal has been removed, and recognizing a plurality of second sign candidates based on the feature information; and
    extracting the second sign satisfying an authentication algorithm from among the plurality of second sign candidates.

6. The sign information providing method of claim 5, wherein the extracting of the second sign satisfying the authentication algorithm comprises extracting the second sign satisfying at least one of a Support Vector Machine (SVM)-based authentication algorithm and a Hidden Markov Model (HMM)-based authentication algorithm.

7. The sign information providing method of claim 1, wherein the extracting of the first sign comprises extracting an arrow indicating the direction of an exit, as the first sign.

8. The sign information providing method of claim 1, wherein the extracting of the second sign from the input image comprises extracting a figure representing the number of an exit, as the second sign.

9. A sign information providing apparatus comprising:
    an extractor configured to extract a first sign from a first area within an input image of an object, wherein the first sign is pre-defined, and to extract a second sign from a second area of the input image, the second sign representing information corresponding to a first sign around the location of the first sign on the object; and
    a provider configured to provide at least one piece of information of information about the first sign and information about the second sign in the form of a voice message.

10. The sign information providing apparatus of claim 9, wherein the extractor extracts a first area at which the first sign is located, removes a noise signal included in the first area, extracts feature information from the first area from which the noise signal has been removed, recognizes a plurality of first sign candidates based on the feature information, and extracts the first sign satisfying an authentication algorithm from among the plurality of first sign candidates.

11. The sign information providing apparatus of claim 9, wherein the extractor extracts a plurality of second area candidates at which the second sign is located, around the first area at which the first sign is located, extracts a second area from among the plurality of second area candidates based on at least one piece of information of brightness information and chroma information of the plurality of second area candidates, and extracts the second sign located in the second area.

12. The sign information providing apparatus of claim 11, wherein when the extractor extracts the second sign, the extractor removes a noise signal included in the second area, extracts feature information from the second area from which the noise signal has been removed, recognizes a plurality of second sign candidates based on the feature information, and extracts the second sign satisfying an authentication algorithm from among the plurality of second sign candidates.

13. The sign information providing apparatus of claim 9, wherein the extractor extracts an arrow indicating the direction of an exit, as the first sign, and extracts a figure representing the number of the exit, as the second sign.

* * * * *